United States Patent
Reinbold (10) Patent No.: US 11,034,412 B2
(45) Date of Patent: Jun. 15, 2021

(54) MULTI-SPROCKET ARRANGEMENT FOR A BICYCLE

(71) Applicant: SRAM Deutschland GmbH, Schweinfurt (DE)

(72) Inventor: Matthias Reinbold, Wuerzburg (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 463 days.

(21) Appl. No.: 15/783,771

(22) Filed: Oct. 13, 2017

(65) Prior Publication Data
US 2018/0105229 A1 Apr. 19, 2018

(30) Foreign Application Priority Data
Oct. 13, 2016 (DE) .................. 10 2016 012 229.3

(51) Int. Cl.
*B62M 9/122* (2010.01)
*B62M 9/10* (2006.01)

(52) U.S. Cl.
CPC .............. *B62M 9/122* (2013.01); *B62M 9/10* (2013.01); *B62M 9/105* (2013.01)

(58) Field of Classification Search
CPC .......... B62M 9/10; B62M 9/105; B62M 9/12; B62M 9/122
See application file for complete search history.

(56) References Cited

U.S. PATENT DOCUMENTS

| 3,478,614 | A | 11/1969 | Shimano | |
|---|---|---|---|---|
| 5,954,604 | A | 9/1999 | Nakamura | |
| 2003/0216201 | A1* | 11/2003 | Takeda | B62M 9/10 474/70 |
| 2009/0042680 | A1* | 2/2009 | Valle | B62M 9/10 474/160 |
| 2016/0101825 | A1* | 4/2016 | Braedt | B62M 9/12 474/160 |
| 2016/0167737 | A1* | 6/2016 | Tokuyama | B62M 9/10 474/160 |
| 2016/0236750 | A1* | 8/2016 | Emura | B62M 9/105 |

FOREIGN PATENT DOCUMENTS

| DE | 202016100725 U1 | 4/2016 |
|---|---|---|
| EP | 2022712 A2 | 2/2009 |

* cited by examiner

*Primary Examiner* — Michael R Mansen
*Assistant Examiner* — Robert T Reese (57) ABSTRACT

The invention relates to a multi-sprocket arrangement for installation on a rear-wheel hub and for engagement with a bicycle chain. The multi-sprocket arrangement includes at least ten adjacent sprockets with different numbers of teeth. In each case of the at least ten adjacent sprockets two adjacent sprockets of the sprockets are arranged with a defined spacing to one another. The defined spacing corresponds either to a smallest spacing or to a larger spacing.

15 Claims, 11 Drawing Sheets

MULTI-SPROCKET ARRANGEMENT FOR A BICYCLE

This application claims priority to, and/or the benefit of, German patent application DE 10 2016 012 229.3, filed on Oct. 13, 2016, the contents of which are herein referenced in their entirety.

FIELD OF THE INVENTION

The invention generally relates to a bicycle drive, and specifically the invention relates to a multi-sprocket arrangement for installation on a rear-wheel hub of a bicycle, and/or to a bicycle drive having the multi-sprocket arrangement.

BACKGROUND

The number of sprockets on multi-sprocket arrangements for installation on a rear-wheel hub of a bicycle has increased ever further in recent years. A large number of sprockets permits good gear/transmission ratio coverage and/or a fine graduation between the different gear ratio stages. Ten or eleven sprockets in combination with one, two or three front chain rings represent common bicycle drives. More modern drives use even twelve to fourteen sprockets, normally in combination with one or two front chain rings, and offer a large gear ratio selection to the bicycle rider.

The increased number of sprockets however also gives rise to problems. Firstly, the structural space in which the sprocket assembly is arranged is restricted owing to the bicycle geometry and various technical standards. The axial structural space for the multi-sprocket arrangement is defined, on the inner side, by the driver stop and the wheel spokes and, on the outer side, by the frame stop. In the installed state, the largest sprocket of the multi-sprocket arrangement abuts in an axial direction against the driver stop. The largest sprockets of the sprocket assembly can follow the profile of the wheel spokes (these also being referred to as overhanging sprockets). That is to say, the axial width of the multi-sprocket arrangement as measured from the outer side of the smallest sprocket to the inner side of the largest sprocket may be greater in the region of the teeth of the largest sprocket than in the region of the sprocket stop surface of the largest sprocket. Secondly, with the increasing number of sprockets, the chain skew is also increased, which has an adverse effect on the running characteristics and the efficiency of the bicycle drive. An increased chain skew can have the effect that, when the bicycle chain is presently engaging into one of the smaller sprockets, the bicycle chain collides with a next-larger sprocket. This commonly results in generation of noise, wear, friction losses and incorrect gearshifts.

U.S. Pat. No. 3,478,614 addresses the problem of the chain skew. Said document presents a bicycle drive having one front chain ring and one rear sprocket assembly. However, said document describes an outdated sprocket assembly with only five sprockets. Between in each case two adjacent sprockets of the five sprockets, there are four predetermined spacings. The spacings between the largest and the second-largest sprocket and between the second-largest and central sprocket are in this case dimensioned to be smaller than the spacings between the central sprocket and the second-smallest sprocket and between the second-smallest and smallest sprockets. Thus, there is a resulting uniform spacing distribution of small and larger spacings. However, the structural prerequisites for said sprocket assembly are entirely different, because the available structural space does not constitute a problem for only five sprockets.

Also known from the prior art are sprocket assemblies having an increased number of sprockets, which attempt to solve the problem of the restricted structural space and/or of the chain skew in a different manner.

EP 2 022 712 has disclosed a drive having a sprocket assembly with eleven or twelve sprockets. In each case two adjacent sprockets are arranged with a defined spacing. Here, the three sprockets with the smallest diameters are arranged with a greater spacing to one another than the remaining chain rings. In the case of eleven sprockets, there are consequently ten spacings, wherein two larger spacings (P', P'') and eight small spacings (P) are provided. In the case of twelve sprockets, there are consequently eleven spacings, wherein it is likewise the case that two larger spacings (P', P'') and nine small spacings (P) are provided.

DE 20 2016 100 725 discloses a sprocket assembly with 13 sprockets which are positioned with twelve defined spacings to one another. The large ten sprockets are arranged in each case with a constant, smaller spacing. Only the smallest three sprockets are arranged with a larger spacing. There are consequently twelve spacings, which are divided into three larger and nine small spacings. To further counteract the chain skew, it is the case in said bicycle drive that the front chain ring arrangement is mounted in movable fashion. The chain ring arrangement follows the position of the chain on the sprocket and thus produces an approximately neutral chain line. Said solution is however of complex construction, susceptible to failure and suitable only for single front chain rings.

U.S. Pat. No. 5,954,604 has disclosed a sprocket assembly with 14 sprockets. To allow for the restricted structural space, the spacing between the sprockets is reduced to such an extent that it is dimensioned to be smaller than the sprocket thickness, and still offers just enough space for the engaging bicycle chain. The problem of the increasing chain skew is ignored in this case.

SUMMARY AND DESCRIPTION

In an embodiment, a multi-sprocket arrangement for installation on a rear-wheel hub and for engagement with a bicycle chain is provided. The arrangement includes at least ten adjacent sprockets each with a different number of teeth, in each case of the at least ten adjacent sprockets two adjacent sprockets are arranged with a defined spacing to one another, the spacing measured from the outer side of one sprocket to the outer side of the adjacent, next-smaller sprocket. The defined spacing corresponds either to a smallest spacing or to larger spacing, and at most 70% of the defined spacings correspond to the smallest spacing.

In an embodiment, a bicycle drive includes a multi-sprocket arrangement for installation on a rear-wheel hub and for engagement with a bicycle chain comprising a at least ten adjacent sprockets, each with a different number of teeth. The drive also includes a bicycle chain, and a front chain ring arrangement with at least one chain ring. In the drive, the multi-sprocket arrangement and the chain ring arrangement are positioned relative to one another such that when the bicycle chain is engaged with a smallest chain ring of the front chain ring arrangement and runs along a neutral chain line, the multi-sprocket arrangement is divided into a number of larger sprockets on one side of the neutral chain line and a number of smaller sprockets to another side of the neutral chain line, and in that the number of smaller sprockets is equal to or greater than the number of larger sprockets.

DETAILED DESCRIPTION OF THE DRAWINGS

It is the object to provide a modern multi-sprocket arrangement having an increased number of sprockets, which minimizes the consequences of the chain skew without departing from the defined structural space.

Said object is achieved by means of a multi-sprocket arrangement for installation on a rear-wheel hub and for engagement into a bicycle chain according to embodiments disclosed herein. The multi-sprocket arrangement has at least ten adjacent sprockets each with a different number of teeth. In each case two adjacent sprockets of the sprockets are arranged with a defined spacing to one another. The spacing is measured from the outer side of one sprocket to the outer side of the adjacent, next-smaller sprocket. Each defined spacing corresponds either to a smallest spacing or to a larger spacing. Here, at most 70% of the defined spacings correspond to the smallest spacing.

The disclosed multi-sprocket arrangement encompasses both arrangements with only a single smallest spacing and arrangements with a series of smallest spacings of equal size. It is crucial that all spacings which have a larger spacing dimension than the smallest spacing are to be counted among the larger spacings.

An advantage of this refinement is that, owing to the division of the defined spacings into smallest spacings and larger spacings, both the defined structural space can be adhered to, and the effects of the chain skew can be curtailed.

The defined spacings are divided into smallest spacings and larger spacings. In the case of a fraction of at most 70% of smallest spacings, it is thus the case that at least 30% of all of the defined spacings fall among the larger spacings. The fraction of smallest spacings ensures that the sprockets are positioned close to one another and thus require little structural space. By contrast, the fraction of larger spacings assists in lessening the adverse consequences of the chain skew.

In one embodiment of the multi-sprocket arrangement, at most 60% of the defined spacings correspond to the smallest spacing. In the case of this fraction, at least 40% of the defined spacings correspond to the larger spacings.

In one embodiment of the multi-sprocket arrangement, at most 50% of the defined spacings correspond to the smallest spacing. In the case of this fraction, at least 50% of the defined spacings fall among the larger spacings.

It is particularly preferable if a fraction of approximately 45% of the defined spacings correspond to the smallest spacing. Conversely, this means that approximately 55% of all of the spacings fall among the larger spacings. With this spacing distribution, the axial width of the sprocket assembly is just small enough to fit into the defined structural space, and at the same time, the chain is provided with enough space that it does not collide with adjacent sprockets even in the case of maximum chain skew.

In one embodiment of the multi-sprocket arrangement, the smallest spacings are arranged in the region of the larger sprockets with larger numbers of teeth. In the case of a very small fraction of smallest spacings, it is even possible for only one single smallest spacing A1 to be provided, which is arranged in the region of the larger sprocket. The number of teeth of a sprocket is associated with the diameter thereof. With increasing number of teeth, the sprocket diameter also increases. That is to say, the sprockets with larger numbers of teeth are the sprockets of larger diameter, and the sprockets with smaller numbers of teeth are the sprockets of smaller diameter of the multi-sprocket arrangement.

In one embodiment of the multi-sprocket arrangement, the larger spacings are arranged in the region of the smaller sprockets with smaller numbers of teeth.

In the region of the smaller sprockets, the consequences of the chain skew are particularly adverse, because it would be possible in said region for the skewed chain to collide with the next-larger sprocket. This is of less significance in the region of the larger sprockets because the skewed chain has enough space to run across the next-smaller sprocket. To remain within the dimensions of the defined structural space, it is therefore sufficient for the smaller sprockets to be positioned with a larger spacing to one another. By contrast, the larger sprockets may be positioned closer together. It is additionally possible for other measures for lessening the consequences of the chain skew to be used at the larger sprockets.

The spacing between two adjacent sprockets is measured from the outer side of one sprocket to the outer side of the adjacent, next-smaller sprocket. In one embodiment, the spacings which correspond to the smallest spacing have a dimension which corresponds at least to the sum of the axial thickness of the next-smaller sprocket plus a thickness of an inner link plus a thickness of an outer link of the bicycle chain. A small amount of play is added to this theoretical minimum spacing dimension and ensures that the bicycle chain can engage into the teeth of a sprocket without colliding with an adjacent sprocket.

In one embodiment of the multi-sprocket arrangement, the spacings which correspond to a larger spacing are constant. Multiple larger spacings thus have an equal spacing dimension which is greater than the spacing dimension of the smallest spacing or of the smallest spacings.

In an alternative embodiment of the multi-sprocket arrangement, the spacings which correspond to the larger spacing are not constant. The larger spacings increase in distance particularly linearly. This means that the spacings between successive sprockets increase linearly from one sprocket pair to the next. The smaller the sprocket, the larger the spacing thereof to the next-larger sprocket. The linear increase of the larger spacings follows the chain skew, which increases in the outward direction or in the direction of the small sprockets. Alternatively, the spacings which correspond to the larger spacing increase non-linearly. It is thus possible for the particularly severe chain skew on the smallest sprocket to be counteracted.

In one embodiment of the multi-sprocket arrangement, the spacings which correspond to the larger spacing are greater than the smallest spacings by approximately 2% to 15%.

In one embodiment of the multi-sprocket arrangement, the multi-sprocket arrangement comprises exactly twelve sprockets. The smallest of the twelve sprockets has exactly ten teeth, and the largest of the twelve sprockets has either 26, 28, 32 or 33 teeth. The ratio of smallest number of teeth to largest number of teeth is also referred to as spread, and is definitive of the available transmission ratios. The greater the spread, the greater is the difference between greatest and smallest transmission ratio.

Depending on the drive type, other numbers of teeth are also possible. For a drive with only one front chain ring and thirteen rear sprockets, it is possible in particular for ten or eleven teeth to be provided on the smallest sprocket and 36 teeth to be provided on the largest sprocket.

Drives for mountain bikes normally have an even greater spread. In the case of sprocket arrangements with eleven sprockets, it is in particular conceivable for ten teeth to be provided on the smallest sprocket and 42 teeth to be provided on the largest sprocket, or for eleven teeth to be provided on the smallest sprocket and 46 teeth to be provided on the largest sprocket. In the case of arrangements with twelve sprockets, an expedient spread is realized by means of 10 teeth on the smallest sprocket and 50 teeth on the largest sprocket, or 11 teeth on the smallest sprocket and 55 teeth on the largest sprocket.

In one embodiment of the multi-sprocket arrangement, the smallest sprocket with the smallest number of teeth has a ridge or bulge in the region of the root circle. Said ridge pushes the bicycle chain which engages into the smallest sprocket further outward in an axial direction, that is to say away from the next-larger sprocket, and thereby prevents a collision with said next-larger sprocket. In this way, the consequences of the chain skew, which is most pronounced at the smallest sprocket, are lessened further. Since the ridge is arranged only in the region of the root circle, and the region of the tooth tip of the smallest sprocket is not also thickened, said ridge guides the chains but does not at the same time cause disruption during gearshift processes when the chain moves from the region of the root circle into the region of the tooth tip. That is to say, the further the chain moves radially outward on the sprocket, the greater the extent to which it is also, owing to the tooth which becomes thinner in relation to the ridge, displaced axially in the direction of the next-larger sprocket.

The ridge may be used either on its own or in combination with a larger spacing A2-A7 between the smallest and second-smallest sprocket. The combination of both is particularly effective.

In one embodiment of the multi-sprocket arrangement, at least one sprocket of the sprocket arrangement has a sequence of a thin tooth, a thick tooth and a further thin tooth. Here, a thick tooth is designed to be of such a thickness that, although it can engage into an outer link pair of the chain, it cannot engage into an inner link pair. This has a positive effect on the chain guidance, because the thick teeth fill the gap between the outer links of the chain to a greater extent than normal teeth, and thus the chain has less freedom of movement relative to the sprocket. The specific direct sequence of a thin tooth, a thick tooth and a further thin tooth has proven to be expedient. This sequence may repeat multiple times along the circumference of a sprocket. In the case of sprockets with an even number of teeth, it is also possible for all of the teeth to be alternately thin and thick. The axial thickening may be realized either on both sides, that is to say on the inner and outer sides of the sprocket, or only on one side. The thickening is preferably arranged only on the inner side of the sprocket, that is to say in the direction of the centre of the bicycle. The outer side of the sprocket may thus remain flat, which is relevant for the creation of gearshift channels. To simultaneously also make the multi-sprocket arrangement capable of performing gearshifts, the sprockets have not only the sequence of thin and thick teeth but also indentations and/or bevels which form the gearshift channels. The sequence of alternating thin and thick teeth may be arranged on one or more sprockets. It is of particular significance in particular at the two largest sprockets, because it is there that the chain skew is at its most pronounced. As a result of the better guidance of the chain, the adverse consequences of the chain skew at the larger sprockets are minimized. The vibration of the chain generated as a result of the skew is reduced. With this, the associated increased generation of noise and risk of chain jump-off are also reduced. Furthermore, the teeth of the largest sprocket may have rounded slide-off bevels on the inner side. That is to say, the transition between the slide-off bevel situated at the tooth tip and the tooth body runs tangentially, that is to say without an edge. The tangential transition without an edge makes it possible for the skewed chain to nevertheless pass out of engagement in a smooth and quieter manner. In the case of a transition with an edge, the chain, in the case of a high degree of skew, tends to "jump" during the sliding-off movement, which leads to even more vibrations and noise. The rounded slide-off bevels on the inner side of the sprocket are in turn of significance in particular at the largest sprockets, on which the chain skew is at its greatest.

In one embodiment of the multi-sprocket arrangement, at least some of the adjacent sprockets of the sprocket arrangement are manufactured integrally or from one piece. Particularly high-grade sprocket assemblies are even manufactured entirely from one piece, in particular by milling. The sprocket arrangements are composed of a single part, which does not have to be assembled further.

Sprocket arrangements manufactured in one piece, and sprocket arrangements which are for the most part manufactured in one piece, are however susceptible to generation of noise during the engagement of the chains. The applicant's DE 10 2011 010 855 discloses means for damping the impacting chain. Said document describes, in particular, elastic damping rings which are arranged between the sprockets and which thus contribute to the reduction of noise. The combination of such rubber rings with the rounded bevels on the teeth of the largest sprockets make a particularly effective contribution to the reduction of noise.

Less expensive manufacturing methods are alternatively also expedient. The largest sprocket is commonly manufactured as a separate sprocket and subsequently connected to, in particular plugged together with, the remaining sprockets, which are manufactured in one piece. It would also be conceivable for each sprocket of the sprocket assembly to be manufactured separately, in particular by punching, and subsequently connected. The individual sprockets may for example be plugged together, in particular riveted, connected to one another by means of a separate component (spider), or welded together. A combination of the stated joining types, or of other common joining types, in one sprocket assembly is likewise conceivable.

The invention also relates to a bicycle drive having such a multi-sprocket arrangement according to embodiments described herein, a bicycle chain, and a front chain ring arrangement with at least one chain ring. The multi-sprocket arrangement and the chain ring arrangement are positioned relative to one another such that, when the bicycle chain runs along a neutral chain line, the multi-sprocket arrangement is divided into a number of larger sprockets with a larger number of teeth and a number of smaller sprockets with a smaller number of teeth. Here, the number of smaller sprockets is equal to or greater than the number of larger sprockets.

In particular, the larger sprockets with a larger number of teeth are arranged in each case with the smallest spacing to one another, and the smaller sprockets with a smaller number of teeth are arranged in each case with a larger spacing to one another.

This arrangement of the bicycle drive minimizes the consequences of the chain skew, in particular in the region of the smaller sprockets, which are arranged to the right or to the outside of the neutral chain line.

In one embodiment of the bicycle drive, the multi-sprocket arrangement comprises exactly twelve sprockets, and the chain ring arrangement comprises exactly two chain rings. In the case of this arrangement, the neutral chain line of the bicycle chain runs between a small chain ring and the sixth sprocket. The neutral chain line thus divides the twelve sprockets into five larger sprockets R1-R5 with larger numbers of teeth and six smaller sprockets R7-R12 with smaller numbers of teeth. Here, the five larger sprockets R1-R5 are arranged in each case with the smallest spacing to one another, and the six larger sprockets are arranged in each case with a larger spacing.

The spacing distribution may also be applied to other bicycle drives. Accordingly, drives with one, two or three front chain rings in combination with multi-sprocket arrangements with ten to 14 sprockets are also conceivable, which have corresponding fractions of smallest spacings and larger spacings.

For chain ring arrangements with two chain rings, use could be made of the following graduation configurations: large chain ring 50 teeth, small chain ring 37 teeth; large chain ring 48 teeth, small chain ring 35 teeth; large chain ring 46 teeth, small chain ring 33 teeth.

In one embodiment of the bicycle drive, said bicycle drive has an electrically controlled gearshift mechanism and/or an electrically controlled front derailleur. The electric gearshift mechanism and/or the electric front derailleur are preferably controlled wirelessly.

Figure 1:
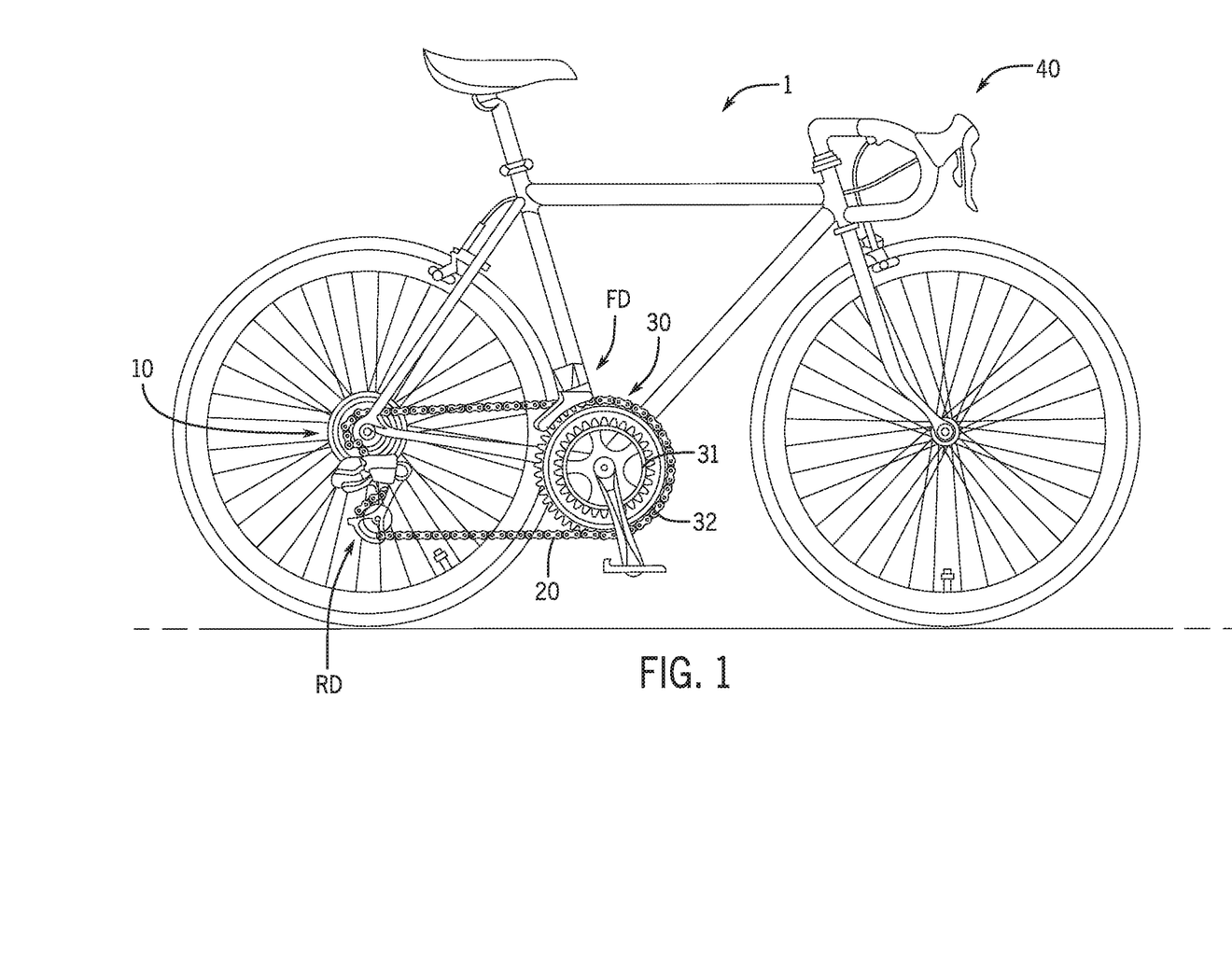
FIG. 1 shows a bicycle having a multi-sprocket arrangement according to an embodiment of the invention.

The directional specifications right/left, upward/downward and rearward/forward used herein relate to a bicycle as viewed in a direction of travel (cf. FIG. 1). The directional specifications inward/outward relate to the centre of the bicycle. Axially relates to the central axis of the multi-sprocket arrangement. Accordingly, the sprockets of smaller diameter with a smaller number of teeth of the multi-sprocket arrangement are arranged axially further to the right or further outward (also referred to as "outboard") than the sprockets of larger diameter with a larger number of teeth. The larger sprockets are conversely thus arranged axially further to the left or further inward (also referred to as "inboard") than the smaller sprockets. By contrast to this, the smaller chain ring of the front chain ring arrangement is arranged further to the left or further to the inside than the large chain ring. The teeth are arranged radially at the outside on the sprocket and on the chain ring.

FIG. 1 shows a bicycle 1 with a multi-sprocket arrangement 10 and with a bicycle drive. The bicycle drive is composed of a front chain ring arrangement 30, which comprises a small chain ring 31 and a large chain ring 32, of a rear multi-sprocket arrangement 10, and of a bicycle chain 20. The multi-sprocket arrangement 10 is composed of an increased number of at least ten adjacent sprockets R1-R10, in particular twelve sprockets R1-R12. The sprockets R of the sprocket arrangement 10 have different numbers of teeth and are arranged with a defined spacing A to one another. The defined spacings A differ in size and can be divided into smallest spacings A1 and larger spacings A2-A7. The bicycle chain 20 is in engagement with the teeth of one of the chain rings, in the situation shown the large chain ring 32, of the chain ring arrangement 30 and with the teeth 11 of one of the adjacent sprockets RN of the multi-sprocket arrangement 10. By means of the bicycle chain 20, force is transmitted from the front chain ring arrangement 30 to the rear multi-sprocket arrangement 10. A front derailleur FD moves the bicycle chain 20 from one chain ring to the other chain ring during gearshifts. A rear derailleur or the gearshift mechanism RD moves the bicycle chain 20 from one sprocket RN to the next-smaller sprocket RN+1 or to the next-larger sprocket RN−1 during gearshifts.

The front derailleur FD and/or rear derailleur RD may in this case be either mechanically or electrically operated. In the exemplary embodiment shown, both the front derailleur FD and the rear gearshift mechanism RD are electrically operated. The rear electric gearshift mechanism RD and/or the front electric derailleur FD are actuated wirelessly by means of one or more gearshift devices 40 mounted on the handlebar. In the case of a chain ring arrangement with only one chain ring, the front derailleur is dispensed with.

In order that the rear gearshift mechanism RD can move cleanly to each of the sprockets R1-R12 despite the sprocket spacings A of different size, in the case of an electrically controlled gearshift mechanism, a corresponding gearshift protocol is stored in the control unit of the gearshift mechanism, which gearshift protocol reflects the different spacings A. In the case of manual control of the gearshift mechanism RD, the geometry of the gearshift lever mechanism, in particular the teeth of the gearshift discs situated therein and/or the geometry of the gearshift mechanism fin, would be adapted accordingly to the spacings of different size.

The gearshift device is not only suitable for a racing bicycle, as illustrated, but may be used on a multiplicity of bicycle types, such as mountain bikes, touring bicycles or electric bikes.

Figure 2:
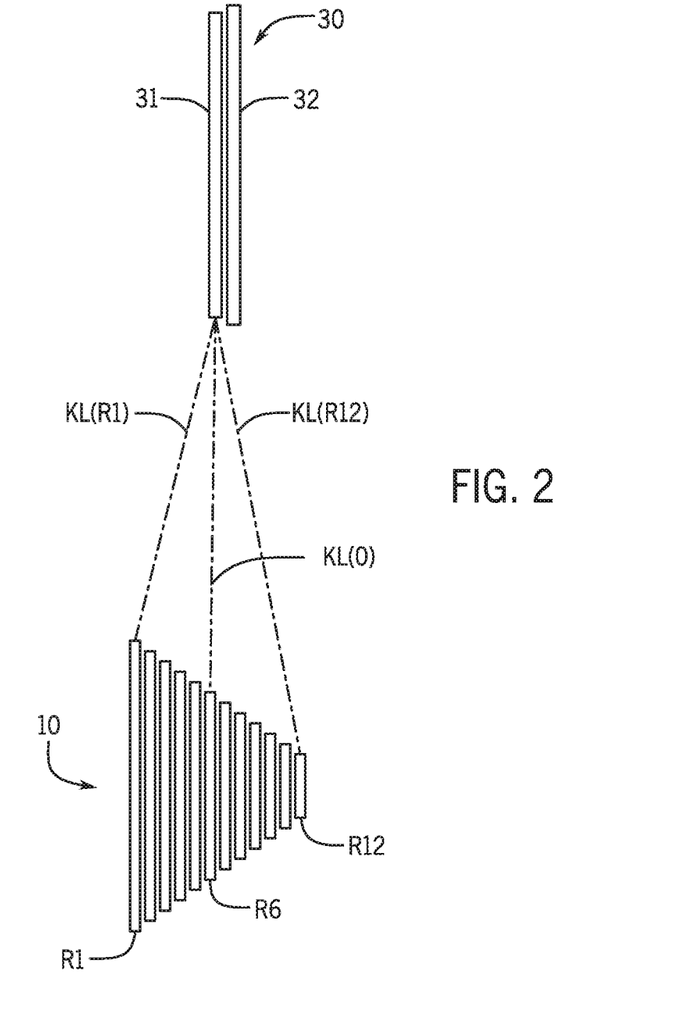
FIG. 2 shows a schematic illustration of the chain skew.

FIG. 2 shows a schematic illustration of a bicycle drive for illustrating the chain skew. The front chain ring arrangement 30 comprises a smaller chain ring 31 and a larger chain ring 32. The multi-sprocket arrangement 10 comprises twelve sprockets (R1-R12), wherein the sprocket R1 is the largest-diameter sprocket and the sprocket R12 is the smallest-diameter sprocket. The chain ring arrangement 30 is oriented in relation to the multi-sprocket arrangement 10 such that a neutral chain line KL0 is realized when the chain is in engagement with the small chain ring 31 and the sixth-largest sprocket R6. The neutral chain line KL0 corresponds approximately to the ideal profile of the chain, in the case of which virtually no chain skew arises. Here, the front chain ring which is in engagement is in alignment with the rear sprocket which is in engagement. The forces can be transmitted optimally from the chain ring to the sprocket. A particularly great deflection of the chain from said neutral chain line KL0, or particularly severe chain skew arises, if the chain is in engagement with the largest sprocket R1 or with the smallest sprocket R12.

The chain line KLR12 from the small chain ring 31 to the smallest sprocket R12 is particularly critical because it involves the most severe skew of all possible chain profiles of the drive. Furthermore, on the smaller sprockets, there is additionally the risk of the skewed chain colliding with the next-larger sprocket. This is counteracted by the spacing distribution.

The neutral chain line KL0 divides the sprocket assembly 10 with its twelve sprockets R1-R12 into five sprockets R1-R5 with larger diameters situated further inward or to the left, and six sprockets R7-R12 with smaller diameters situated further outward or to the right. If the chain is in engagement with the large sprocket 32 situated further to the outside, the neutral chain line KL0 is also shifted toward the outside, for example onto the sprocket R7. Correspondingly, the particularly critical skew on the smallest sprocket R12 is slightly less severe.

Depending on the frame geometry and drive, the neutral chain line is shifted further inward or outward. A bicycle drive as described herein may be composed of a combination of one, two or three front chain rings and ten, eleven, twelve, thirteen or fourteen sprockets. In the case of drives with two or three front chain rings, the neutral chain line KL0 is defined on the smallest of the chain rings, because the chain skew is more severe on said chain ring than on the larger chain rings. It must be noted that the front sprocket arrangement 30 cannot be shifted outward to any desired extent relative to the multi-sprocket arrangement 10. Firstly, this would increase the chain skew on the largest sprocket. Secondly, with the sprocket arrangement, the position of the pedal crank would also be shifted. For ergonomic reasons, the pedal crank should be situated as close as possible to the bicycle frame, that is to say should be situated as far inward as possible. Furthermore, a pedal crank situated far outward would increase the risk, during tight and fast cornering, of the pedal at the inside of the corner touching the ground.

To lessen the consequences of the chain skew on the smaller sprockets, the sprockets situated to the right of the neutral chain line KL0 are ideally arranged with greater spacings to one another than the sprockets to the left of the chain line KL0. In order to remain within the defined structural space, the sprockets to the left of the neutral chain line KL0 are positioned with the smallest possible spacings, in particular extremely small spacings, to one another. To lessen the consequences of the chain skew on the larger sprockets, it is possible in particular for further measures (thick and thin teeth, rounded bevels) to be implemented on the largest sprockets R1 and R2, as will be discussed in conjunction with FIG. 4.

Figure 3:
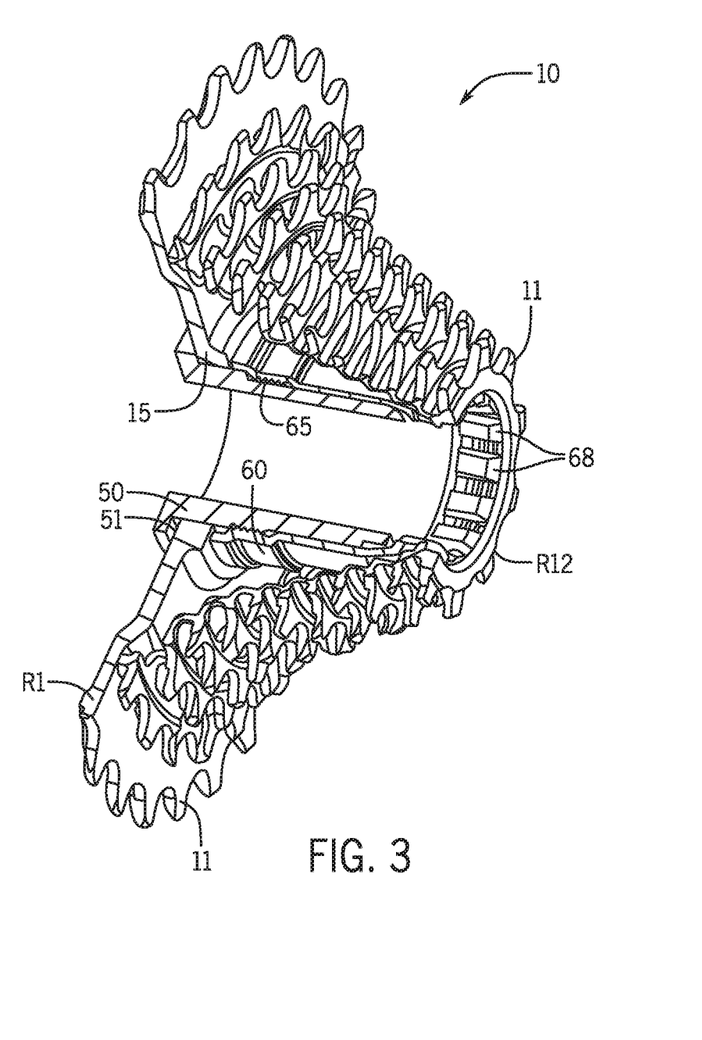
FIG. 3 shows a perspective, partially sectional view of a first embodiment of the multi-sprocket arrangement.

FIG. 3 shows a perspective, partially sectional view of a first embodiment of the multi-sprocket arrangement 10. The sprocket assembly 10 comprises twelve adjacent sprockets (R1-R12) with diameters of different size and with associated different numbers of teeth. The largest sprocket R1 is in torque-transmitting engagement with the driver 50, which transmits the torque to a rear-wheel hub (not illustrated here). For this purpose, the sprocket R1 has an engagement profile 15 which is placed in engagement with a counterpart on the driver 50. The multi-sprocket arrangement 10 is pushed onto the driver 50 to such an extent that the largest sprocket R1 abuts, by means of an abutment region situated radially further inward, against the driver stop 51. The adapter 60 is screwed with its internal thread 65 on the corresponding external thread of the driver 50, and fixes the multi-sprocket arrangement 10 on the driver 50 in an axial direction. For this purpose, the adapter 60 is fastened at one side on the driver 50, in particular by being screwed on, such that the largest sprocket R1 is fixed between the driver stop 51 and the inner end of the adapter 60. Furthermore, secondly, the adapter 60 engages with its snap-action projections 68 behind a corresponding counterpart snap-action projection on the smallest sprocket R12 of the multi-sprocket arrangement 10, and thus fixes the sprocket assembly 10 axially with respect to the driver 50.

The sprockets R2 to R11 are manufactured in one piece, in particular are milled from one piece, and have a conical profile. The largest sprocket R1 is manufactured separately and is connected in torque-transmitting fashion to the rest of the sprockets R2-R11. In order to save weight, the largest sprocket R1 is manufactured in particular from aluminium. In the situation shown, the largest sprocket R1 is fastened to the sprocket R2 by means of a plug-in connection. The sprocket assembly 10 is supported, in the region of the largest sprocket R1 and in the region of the smallest sprockets R10-R12, radially on the driver 50 or on the adapter 60. In between, the sprocket assembly 10 is of self-supporting form. The largest sprocket R1 is of cranked form and accordingly follows the profile of the spokes, as a result of which the sprocket R1 has more axial structural space available to it radially at the outside (in the region of the teeth) than radially at the inside (in the region of the driver). The smallest sprockets R11 and R12 have an inner diameter smaller than the outer diameter of the driver 50, and are arranged further outward than the driver 50 in the axial direction.

Figure 4:
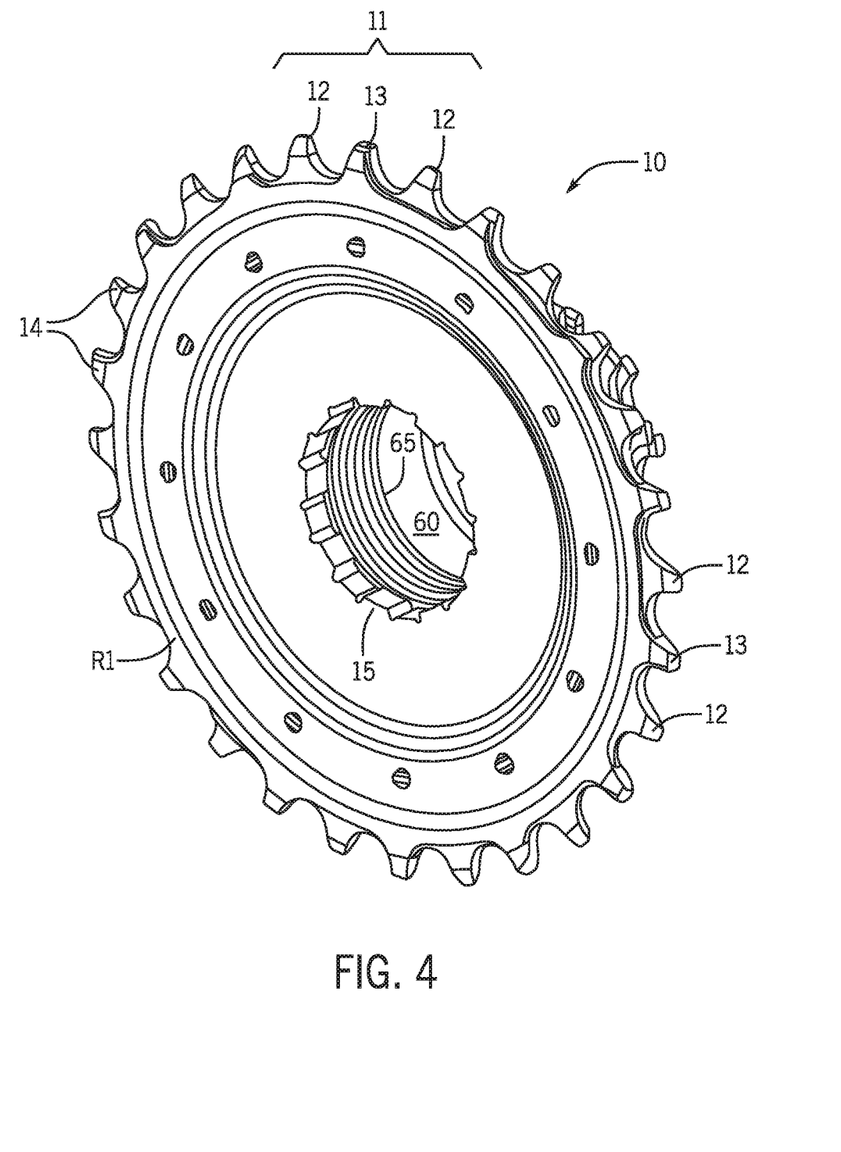
FIG. 4 shows a perspective view of the inside of the first embodiment of the multi-sprocket arrangement.

FIG. 4 shows a perspective view of the inside of the first embodiment of the multi-sprocket arrangement 10 from FIG. 3, but without the driver 50. In this view, the adapter 60 with its internal thread 65 can be clearly seen. The transmission of torque from the sprocket assembly 10 to the driver 50 takes place exclusively in the region of the profile 15 of the largest sprocket R1. It is likewise possible to clearly see the sequence of thin teeth 12 and thick teeth 13. Here, the expressions thick and thin refer to the material thickness of the teeth 11 as measured in the axial direction. In this embodiment, the teeth 12, 13 are thickened and thinned only in one axial direction, specifically in the direction of the inner side of the first sprocket R1. Thus, the outer side of the sprocket R1 remains uniformly flat (cf. FIG. 3), which facilitates the formation of gearshift channels. At the same time, the thickenings for the thick teeth 13 and the recesses for the thin teeth 12 on the inner side of the largest sprocket R1 (cf. FIG. 4) guide engaging chains securely on the sprocket. The improved chain guidance lessens the adverse consequences of the chain skew on the large sprockets. In particular, the vibration of the chain and the associated generation of noise are reduced. The largest sprocket R1 has an even number of in this case 28 teeth 11, such that a repeating sequence of thin teeth 12 and thick teeth 13 along the entire circumference is possible. The second-largest sprocket R2, which is not visible here, also has alternating thick and thin teeth on its inner side. On the two largest sprockets R1 and R2, the chain skew is particularly severe, for which reason improved chain guidance is of particular significance. It would however be possible for thin and thick teeth in alternation to also be provided on further sprockets.

The teeth 11 of the largest sprocket R1 additionally have rounded slide-off bevels 14 on the inner side. That is to say, the transition between the slide-off bevel 14 situated at the tooth tip and the tooth body runs tangentially, that is to say without an edge. The rounded slide-off bevels 14 on the inner side of the sprocket are in turn of particular significance at the largest sprockets, on which the chain skew is particularly severe. Therefore, the second-largest sprocket R2 (not visible here) also has said slide-off bevels (cf. FIG. 5).

A lessening of the consequences of the chain skew could likewise be contributed to by such rounded slide-off bevels also on the outer sides of the smallest sprockets, in particular of the two smallest sprockets. Since, on the larger sprockets situated further inward, the chain runs from the inside outward, it is necessary for the rounded bevels to be arranged on the inner side in the case of the larger sprockets. Conversely, on the smallest sprockets situated further outward, the chain runs from the outside inward, for which reason the rounded slide-off bevels would be arranged on the outer side.

Figure 5:
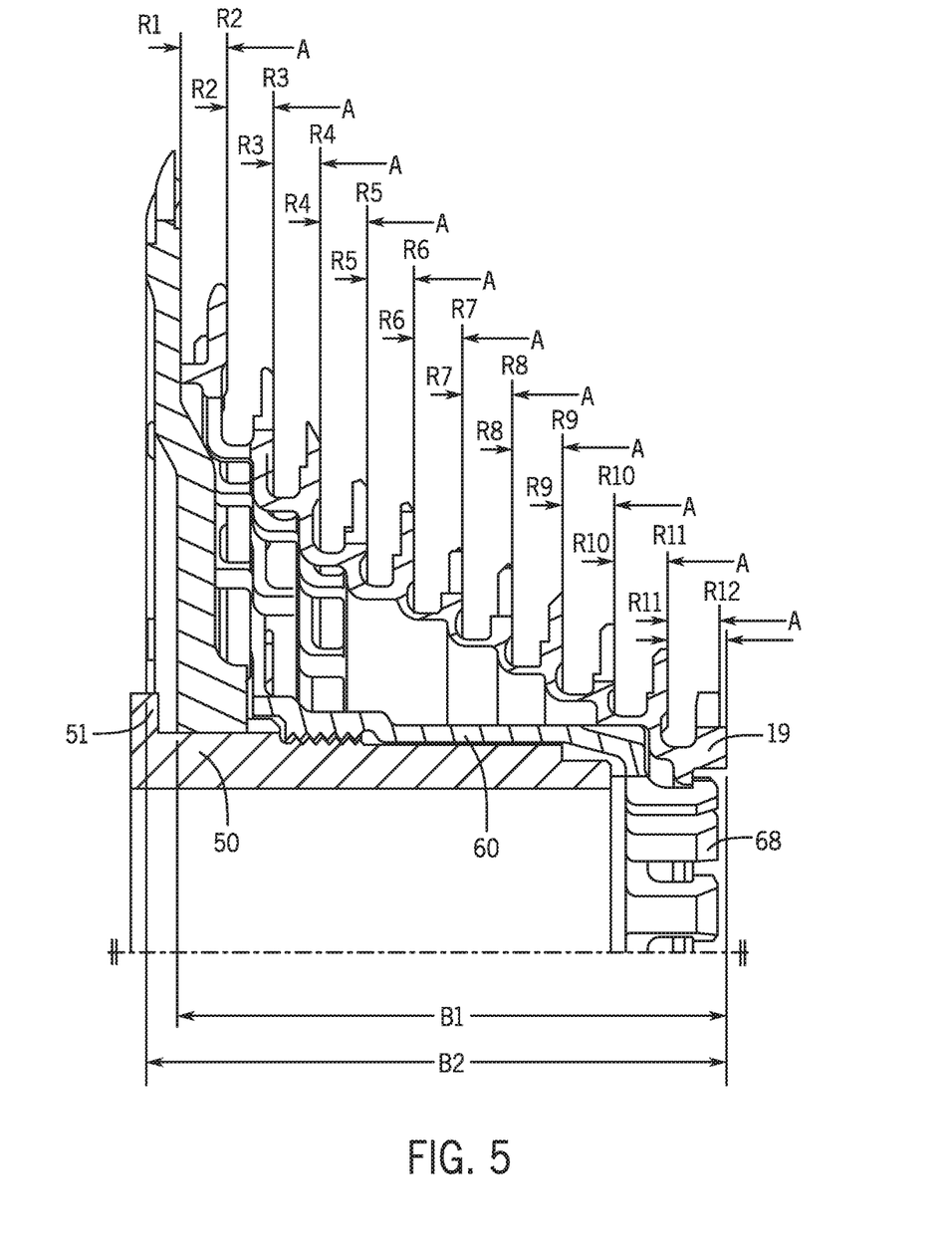
FIG. 5 shows an enlarged sectional illustration of the multi-sprocket arrangement from FIG. 3.

FIG. 5 shows an enlarged sectional illustration of the multi-sprocket arrangement 10 from FIG. 3. It is possible to clearly see the axial fixing of the multi-sprocket arrangement 10 with respect to the driver 50 by means of the adapter 60. The snap-action lugs 68 on the outer end of the adapter 60 engage behind a corresponding projection on the smallest sprocket R12. At the same time, the largest sprocket R1 is fixed between the driver stop 51 and the inner end of the adapter 60. Owing to the cranked form of the largest sprocket R1, the axial width B1 of the multi-sprocket arrangement 10 in the region of the driver 50 (radially at the inside) is smaller than the axial width B2 in the region of the teeth (radially at the outside). Here, the width B1 is dimensioned to be smaller than the defined structural space between driver stop 51 and a frame stop (not shown here). The defined structural space varies depending on which driver standard is used. In the situation shown, the axial width B1 of the multi-sprocket arrangement 10 lies between 37 mm and 42 mm, in particular between 40 mm and 41 mm. Here, the axial width B2 in the region of the teeth of the largest sprocket R1 lies between 42 mm and 43 mm.

In each case two adjacent sprockets RN, RN+1 of the twelve sprockets R1-12 are arranged with a defined spacing A to one another. Here, the spacings A are measured in each case from the outer side of one sprocket RN to the outer side of the adjacent, next-smaller sprocket RN+1. That is to say, for example, from the outer side of the largest sprocket R1 to the outer side of the next-smaller sprocket R2, or from the outer side of the second-smallest sprocket R11 to the outer side of the smallest sprocket R12. There are thus consequently eleven defined spacings A between the twelve sprockets R1-12. Said eleven spacings A can be assigned either to a smallest spacing or to larger spacings.

A spacing A encompasses not only the free space between two adjacent sprockets but also the sprocket thickness of the smaller of the two sprockets. The axial thickness of the sprockets R1 to R12 may be constant or may vary. In the situation shown, the torque-transmitting sprocket R1 and the sprocket R2 are formed so as to be slightly thicker than the sprockets R3 to R11. The sprocket R1 and sprocket R2 have teeth 11 which are formed as thin teeth 12 and thick teeth 13. Said thickening of the teeth 13 is, in the situation shown, realized only on the inner side of the sprockets R1 and R2, and is not visible to the outside (cf. FIG. 4). The smallest sprocket R12 additionally has a ridge 19 in the region of the root circle. Said ridge 19 pushes a bicycle chain which engages into the smallest sprocket R12 further outward in the axial direction, and thereby lessens the consequences of the chain skew.

For example, the following axial sprocket thicknesses would be conceivable: R1 corresponds to 2.6 mm, R2 corresponds to 2.4 mm, R3 to R11 correspond to 1.55 mm, and R12 corresponds to 1.75 mm. The ridge 19 preferably has a dimension of 0.4 mm. Sprockets R1 and R2 have a larger dimension owing to the thick teeth 13.

In order to save weight, at least some of the sprockets R1 to R5, or the connecting pieces between the sprockets R1 to R5, have material recesses 17.

Figure 6:
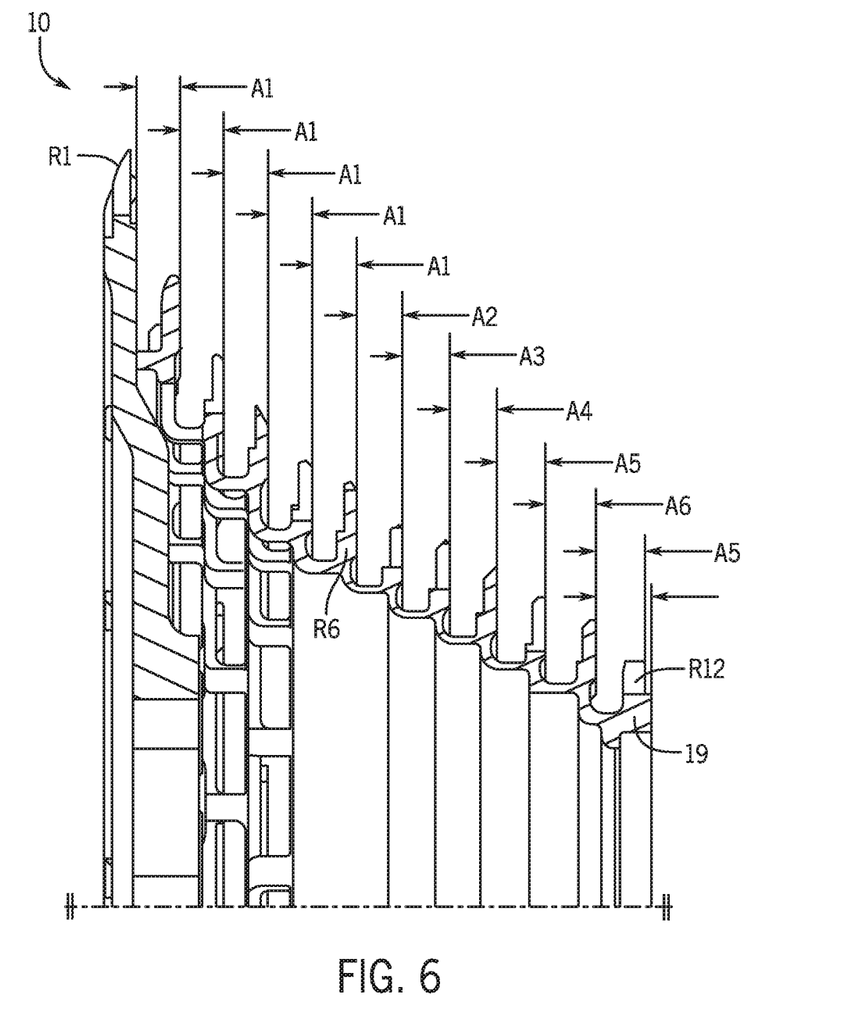
FIG. 6 shows an illustration of the multi-sprocket arrangement from FIG. 5 without a driver or adapter.

FIG. 6 shows the section through the multi-sprocket arrangement 10 from FIG. 5 without the driver and the adapter. The above-described eleven spacings A between in each case two adjacent sprockets RN, RN+1 can be assigned either to a smallest spacing A1 or to larger spacings A2-A6. In the illustrated first exemplary embodiment of the multi-sprocket arrangement 10, the sprockets R1 to R12 are arranged with the following spacings A to one another: A1-A1-A1-A1-A1-A2-A3-A4-A5-A6-A5. The six largest sprockets R1 to R6 are accordingly arranged with a constant smallest spacing A1 to one another. The remaining sprockets R7 to R12 are then spaced apart from one another with a larger spacing A2-A6. The larger spacings A2 to A6 are not constant, and therefore have different reference designations A2 to A6. All of the larger spacings A2 to A6 have a greater dimension than the smallest spacings A1. Of the eleven spacings A of the first embodiment of the multi-sprocket arrangement, five spacings fall among the smallest spacings A1, and six spacings fall among the larger spacings A2-A6. This leads to a spacing ratio of 5:6, or in other words, to a fraction of the smallest spacings A1 of 45.45% and a fraction of larger spacings A2-A6 of 54.55%. The fraction of smallest spacings A1 lies below the maximum values of 70%, of 60% and also of 50%.

Figure 10:
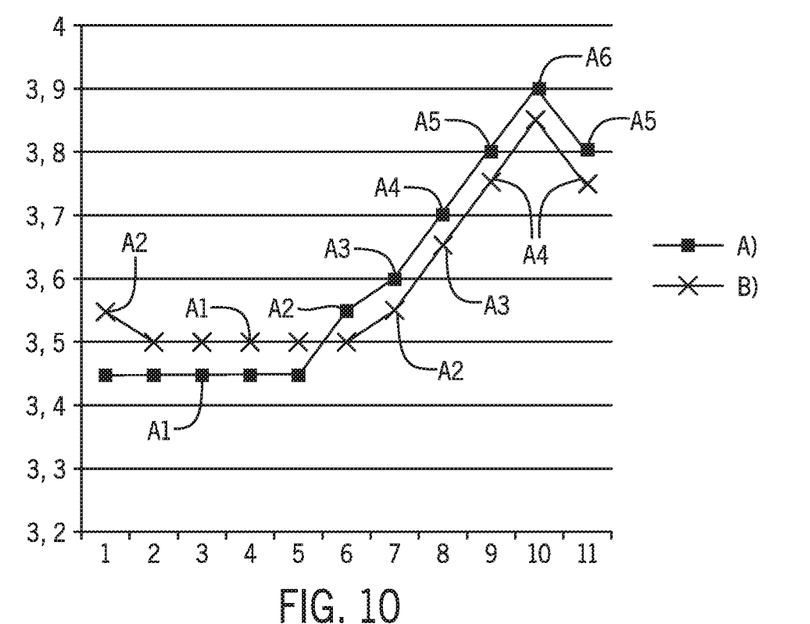
FIG. 10 shows a diagram for illustrating spacing distributions in an embodiment involving twelve sprockets.

This spacing distribution of the multi-sprocket arrangement 10 is also illustrated as graph a) in the diagram in FIG. 10. The diagram assigns dimensional specifications in mm to the spacings A1 to A6. It can be seen that the five smallest spacings A1 have a constant dimension of 3.45 mm, before a larger spacing A2 follows with a dimension of 3.55 mm. This is followed by a further larger spacing A3 with a dimension of 3.6 mm. The spacings A4, A5 and A6 subsequently increase linearly in 0.1 mm steps: A4=3.7 mm, A5=3.8 mm; A6=3.9 mm. The final larger spacing A5 between the sprockets R11 and R12 then corresponds to 3.8 mm again. This spacing A5, which is slightly smaller than the spacing A6, is owing to the additional ridge 19 on the smallest sprocket R12.

It would alternatively be possible for the ridge 19 to be omitted, and for the final larger spacing A7 between sprocket R11 and sprocket R12 to increase further linearly to a value of 4.0 mm. This variant is illustrated in FIG. 11 by the graph c).

Figure 11:
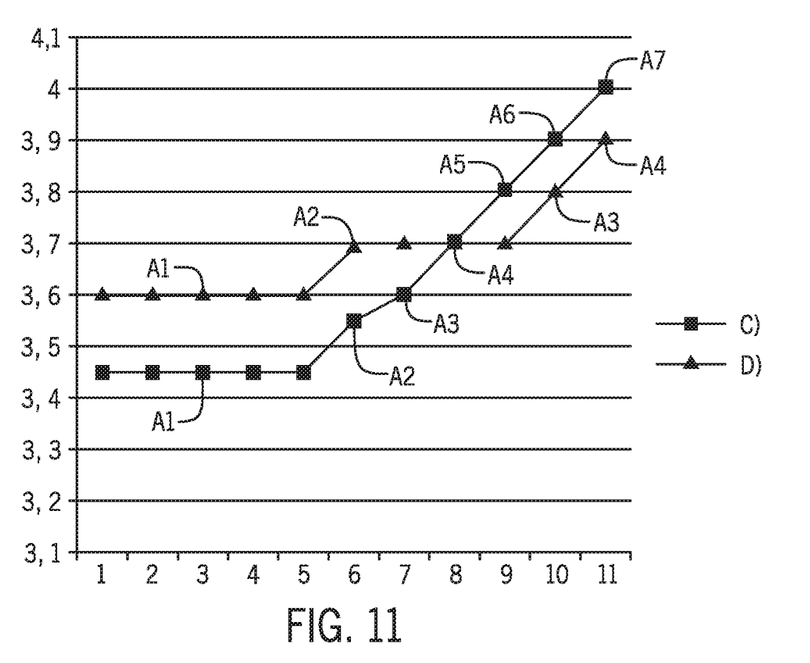
FIG. 11 shows a diagram for illustrating spacing distributions in an embodiment involving twelve sprockets.

For the sake of improved clarity, the five smallest spacings A1 in the graphs in FIGS. 10 and 11 are labelled in each case only once with the reference designation A1. The in each case five smallest spacings A1 have a constant dimension in the variants a) to d).

It can also be seen in FIG. 6 that the connecting pieces which extend in an axial direction between respectively adjacent sprockets are slightly lowered and thus form an encircling groove between adjacent sprockets. Elastic damping rings which are not shown here could be arranged in said groove.

Figure 7:
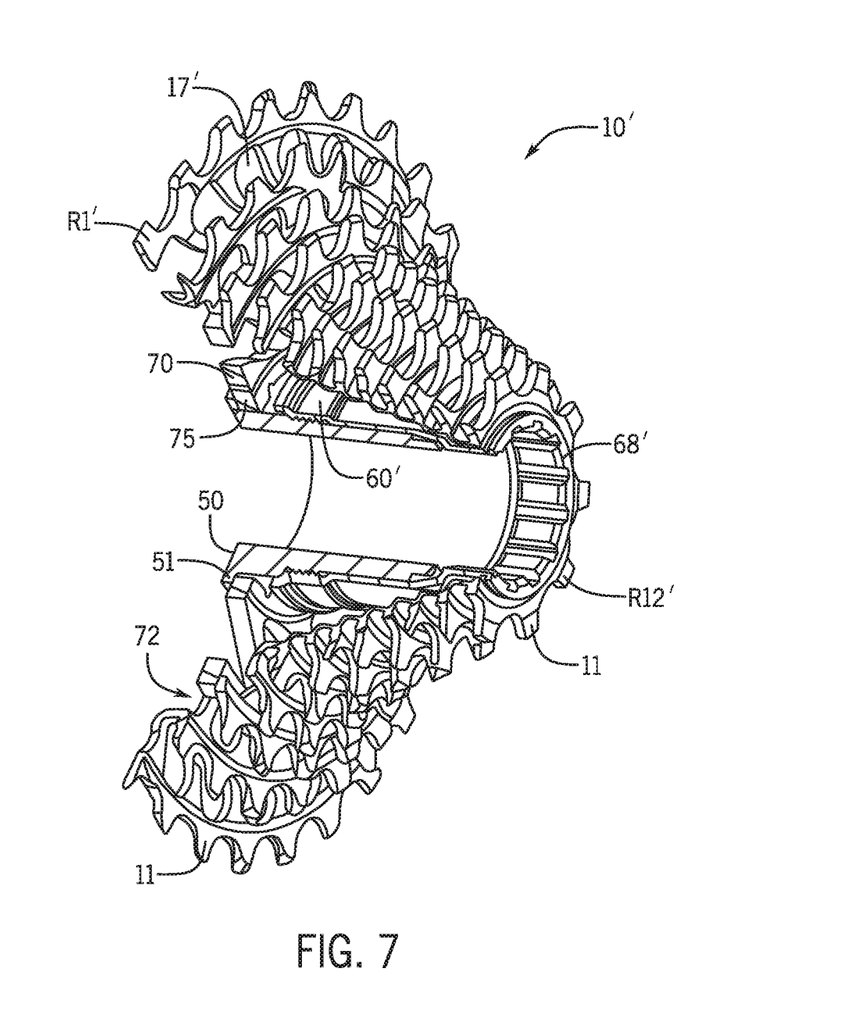
FIG. 7 shows a perspective, partially sectional view of a second embodiment of the multi-sprocket arrangement.

FIG. 7 shows a perspective, partially sectional view of a second embodiment of the multi-sprocket arrangement 10', which largely corresponds to the first embodiment. Unchanged parts are therefore denoted by the same reference designations, and will not be described again, nor will the interaction thereof. The sprocket assembly 10' likewise comprises twelve adjacent sprockets (R1'-R12') with diameters of different size and associated different numbers of teeth. By contrast to the first embodiment, however, it is not the largest sprocket R1' that is in torque-transmitting engagement with the driver 50 but rather a separate component 70. For this purpose, the torque-transmitting component 70 has, along its inner diameter, an engagement profile 75 which is placed in engagement with a counterpart on the driver 50. The component 70 furthermore has, on its outer diameter, a further engagement profile 72 which is placed in engagement with the multi-sprocket arrangement 10'. In the situation shown, the profile 72 engages into the connecting region between the second sprocket R2' and the third sprocket R3'. The entire torque of the multi-sprocket arrangement 10' is thus transmitted, in the region of the second and third sprockets R2'/R3', via the component 70 to the driver 50. The component 70 also serves as a radial support for the sprocket arrangement 10' on the driver 50. Furthermore, the component 70 is axially fixed between the driver stop 51 and the inner end of the adapter 60'. The adapter 60' differs from the first embodiment by the fact that, instead of flexible snap-action projections 68, it has a closed and therefore rigid outer end diameter 68', which is dimensioned to be smaller than the inner diameter of the smallest sprocket R12'. An additional securing ring, in particular a circlip, which is not shown here and which has an outer diameter larger than the inner diameter of the smallest sprocket R12' is, for this purpose, placed into an encircling groove of the outer adapter end and fixes the multi-sprocket arrangement 10' axially relative to the driver 50.

All of the sprockets R1' to R12' are manufactured in one piece, in particular are milled from one piece, and have a conical profile. The sprocket assembly 10' is, in the region of the second and third sprockets R2'/R3' and in the region of the smallest sprockets R10'-R12', supported radially on the driver 50 or on the adapter 60. In between, the sprocket assembly 10' is of self-supporting form.

Figure 8:
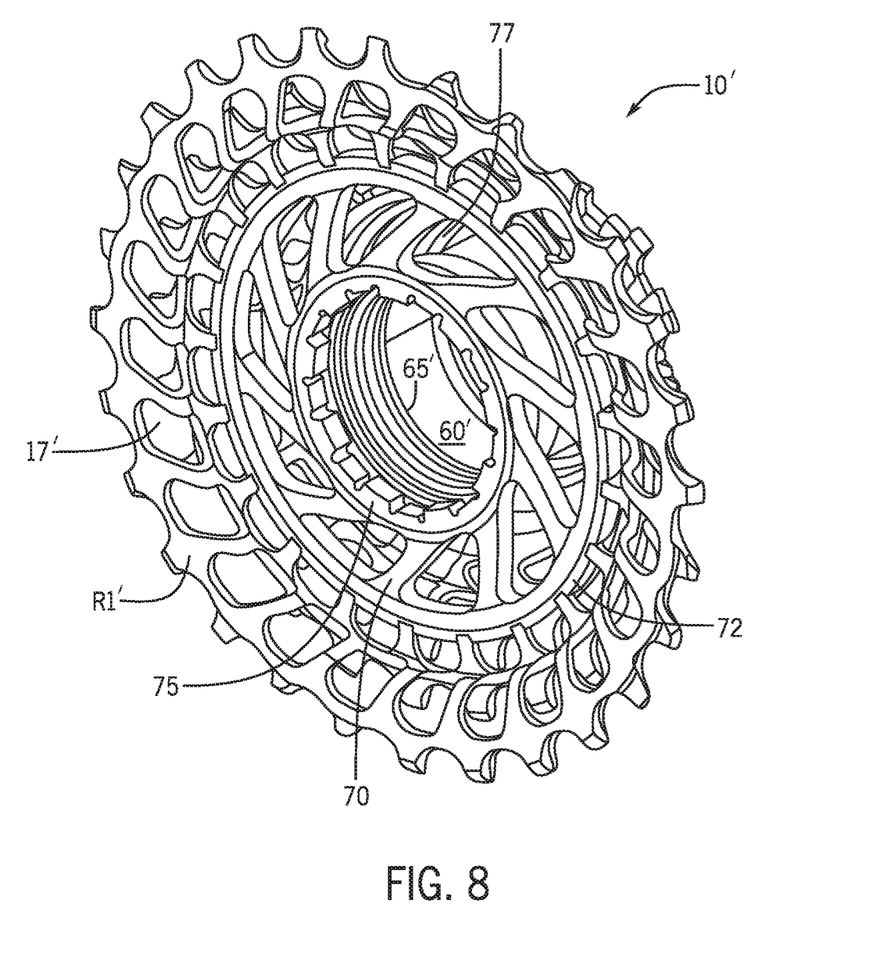
FIG. 8 shows a perspective view of the inside of the second embodiment of the multi-sprocket arrangement.

FIG. 8 is a perspective view of the inside of the second embodiment of the multi-sprocket arrangement 10' from FIG. 7, but without the driver 50, such that the engagement profile 75 of the torque-transmitting component 70 is visible. The engagement of the profile 72 of the component 70 at the outer circumference thereof into the multi-sprocket arrangement 10' is likewise visible. In order to save weight, the larger sprockets R1-R4 have material cutouts 17'. Likewise, the torque-transmitting component 70 has material cutouts 77. In particular, the component 70 is manufactured from aluminium.

Figure 9:
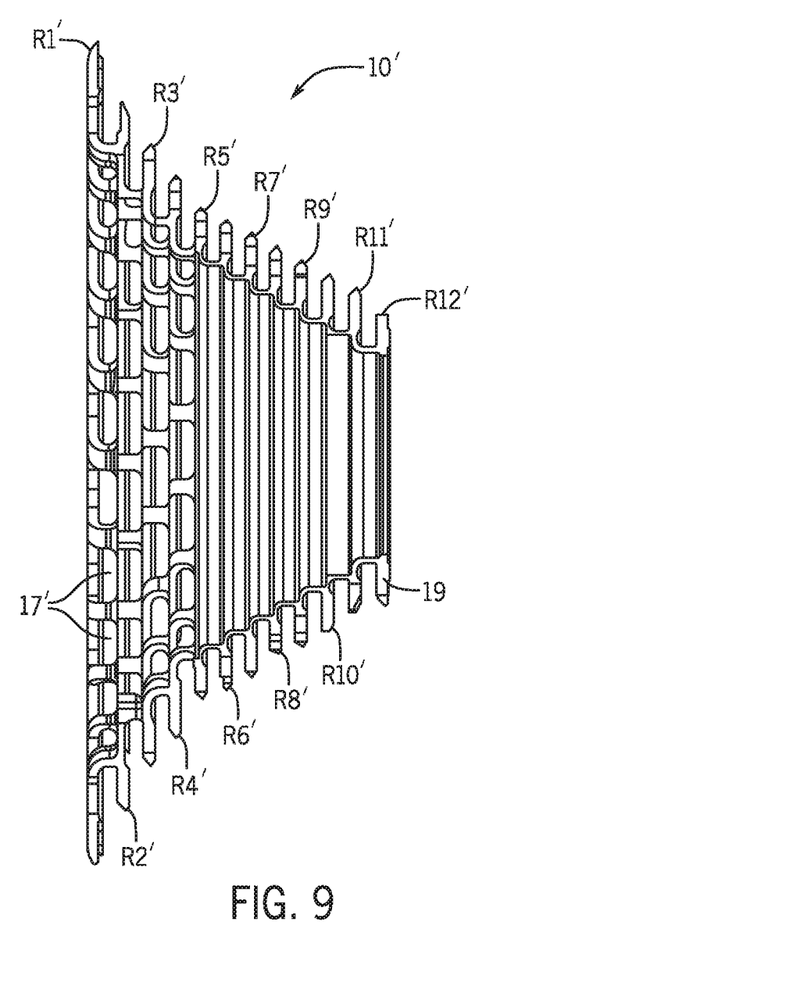
FIG. 9 shows a sectional view of the second embodiment.

FIG. 9 shows a sectional view of the second embodiment of the multi-sprocket arrangement 10' without driver and adapter. The twelve sprockets R1'-R12' are likewise positioned with eleven defined spacings A to one another. Said spacings may be assigned either to smallest spacings A1 or to larger spacings A2. The sprocket thickness corresponds to 1.9 mm at the largest sprocket R1', 1.6 mm at the sprockets R2' to R11', and 1.8 mm at the smallest sprocket R12'. A ridge 19 with a dimension of 0.3 mm may additionally be arranged on the smallest sprocket R12'.

A multi-sprocket arrangement may have various spacing distributions in accordance with embodiments disclosed herein. Exemplary spacing distributions can be seen from the graphs a), b), c) and d) in FIGS. 10, 11 and 12.

Graph b) shows a further variant of the spacing distribution in which, again, five of the eleven spacings fall among the smallest spacings A1, and thus make up a fraction of 45.45%. The dimension of the smallest spacings A1 amounts to 3.5 mm in this case. The remaining six spacings are assigned to the larger spacings A2-A5. The larger spacing A2 amounts to 3.55 mm. The following larger spacings A3, A4 and A5 again increase linearly in 0.1 mm steps: A3=3.65 mm, A4=3.75 mm and A5=3.85 mm. The final spacing decreases again, owing to the ridge 19, to the spacing A4 with 3.75 mm. As an alternative to the ridge, it would however also be possible for a larger final spacing A6 of 3.95 mm to be provided.

In this variant b), the spacing A between the first and second sprockets is a larger spacing A2, and not a smallest spacing A1 as in the other variants. This may be necessary for structural reasons. Specifically in the case of sprocket assemblies manufactured from one piece, as shown in the second embodiment, a smallest spacing A1 would also be possible instead of the larger spacing A2.

The variant d) in FIG. 11 shows a further embodiment of the spacing distribution with five smallest spacings A1 between the six largest sprockets R1-R6. These are followed by four constant larger spacings A2 between the sprockets R6 to R10. The three smallest sprockets R10, R11 and R12 are then positioned with larger spacings A3 and A4 which increase linearly. In this case, the five smallest spacings A1 correspond in each case to a dimension of 3.6 mm, the four larger spacings A2 correspond in each case to a dimension of 3.7 mm, the larger spacing A4 corresponds to a dimension of 3.8 mm, and the larger spacing A5 corresponds to a dimension of 3.9 mm.

Figure 12:
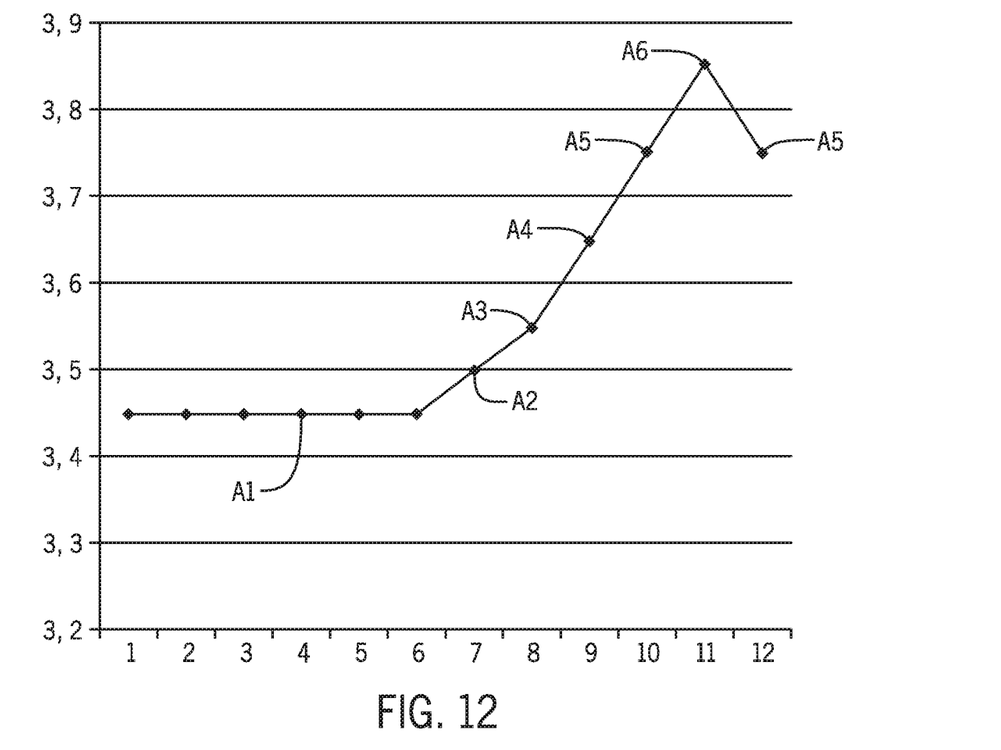
FIG. 12 shows a diagram for illustrating a spacing distribution for an embodiment involving 13 sprockets.

FIG. 12 shows a further possible spacing distribution for a multi-sprocket arrangement with thirteen sprockets R1-R13 and, correspondingly, twelve spacings A. Here, the largest sprockets R1 to R7 are arranged in each case with a smallest spacing A1. In the situation shown, said six smallest spacings A1 correspond in each case to a dimension of 3.45 mm. The narrow construction in the region of the larger sprockets saves space. The remaining sprockets R8 to R13 are then arranged with larger spacings A2-A6 to one another, and thus lessen the consequences of the chain skew on the smaller sprockets. The larger spacings A2-A6 increase non-linearly. A2 corresponds to a dimension of 3.5 mm, A3 corresponds to a dimension of 3.55 mm, A4 corresponds to a dimension of 3.65 mm, A5 corresponds to a dimension of 3.75 mm, and A6 corresponds to a dimension of 3.85 mm. The smallest sprocket R13 is then again arranged with the larger spacing A5. This in turn is owing to a possible ridge on the smallest sprocket R13.

It would alternatively be possible for the ridge to be omitted and for the final spacing to increase further to a larger spacing A7 of 3.95 mm.

In order that the chain can be placed in engagement with the sprockets, the smallest spacings must have a minimum dimension. Said minimum dimension, because it is measured from the outer surface of one sprocket to the outer surface of the next-smaller sprocket, corresponds at least to the sum of the axial thickness of the next-smaller sprocket, the thickness of a chain inner link and the thickness of a chain outer link. A chain which is suitable for use with a multi-sprocket arrangement with an increased number of at least ten sprockets is of particularly narrow form. For example, it would be possible for the thickness of the chain inner link and that of the chain outer link to have an equal dimension of in each case 0.75 mm or 0.8 mm. On the basis of the relatively narrow sprockets of the exemplary embodiments, which have a dimension of 1.55 mm, this thus yields a minimum spacing of 3.05 mm (1.55 mm plus 0.75 mm plus 0.75 mm). In the other exemplary embodiment, the relatively narrow sprockets have a dimension of 1.6 mm. In the case of equal chain link thicknesses of 0.8 mm, this yields a minimum spacing of 3.2 mm (1.6 mm plus 0.8 mm plus 0.8 mm). A certain amount of play is additionally added to this theoretical minimum dimension in order that the chain does not become jammed. The theoretical minimum spacing forms the basis for the calculation of the smallest spacing A1, which in the variants shown lies between 3.45 mm and 3.6 mm. The calculation of the smallest spacing A1 is in fact highly dependent on the chain that is used and on the exact geometry and dimensions thereof. All dimensions are subject to the usual manufacturing tolerances.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A multi-sprocket arrangement for installation on a rear-wheel hub and for engagement with a bicycle chain, the arrangement comprising:
   at least twelve adjacent sprockets each with a different number of teeth, in each case of the at least twelve adjacent sprockets two adjacent sprockets are arranged with a defined spacing to one another, the spacing measured from the outer side of one sprocket to the outer side of the adjacent, next-smaller sprocket,
   wherein the defined spacing corresponds either to a smallest spacing or to a larger spacing, and less than 50% of the defined spacings correspond to the smallest spacing,
   wherein the larger spacing is arranged between a largest sprocket and a next-largest sprocket of the at least twelve adjacent sprockets.

2. The multi-sprocket arrangement of claim 1, wherein the one or more spacings which correspond to the smallest spacing are arranged between the larger spacings with larger numbers of teeth.

3. The multi-sprocket arrangement of claim 2, wherein the spacings corresponding to the larger spacings are arranged in between the smaller sprockets with smaller numbers of teeth.

4. The multi-sprocket arrangement of claim 1, wherein the spacings which correspond to the smallest spacing correspond at least to the sum of an axial thickness of the next-smaller sprocket plus a thickness of an inner link plus a thickness of an outer link of the bicycle chain.

5. The multi-sprocket arrangement of claim 1, wherein the spacings which correspond to larger spacing are constant.

6. The multi-sprocket arrangement of claim 1, wherein the spacings which correspond to larger spacing are not constant.

7. The multi-sprocket arrangement of claim 6, wherein the spacings which correspond to larger spacing increase linearly.

8. The multi-sprocket arrangement of claim 6, wherein the spacings which correspond to larger spacing increase non-linearly.

9. The multi-sprocket arrangement of claim 1, wherein the spacings which correspond to larger spacing are larger than the smallest spacings by approximately 2% to 15%.

10. The multi-sprocket arrangement of claim 1, wherein the smallest sprocket comprises exactly ten teeth, and the largest sprocket comprises 26, 28, 32 or 33 teeth.

11. The multi-sprocket arrangement of claim 1, wherein the smallest sprocket has a ridge in the region of the root circle.

12. The multi-sprocket arrangement of claim 1, wherein at least one sprocket of the sprocket arrangement has a sequence of a thin tooth, a thick tooth and a further thin tooth.

13. The multi-sprocket arrangement of claim 1, wherein at least some of the adjacent sprockets are manufactured integrally.

14. A bicycle drive including the multi sprocket arrangement of claim 1, the bicycle drive further comprising:
    a bicycle chain; and
    a front chain ring arrangement with at least one chain ring,
    wherein the multi-sprocket arrangement and the chain ring arrangement are positioned relative to one another such that when the bicycle chain is engaged with a smallest chain ring of the front chain ring arrangement and runs along a neutral chain line, the multi-sprocket arrangement is divided into a number of larger sprockets on one side of the neutral chain line and a number of smaller sprockets to another side of the neutral chain line, and in that the number of smaller sprockets is equal to or greater than the number of larger sprockets.

15. The bicycle drive of claim 14, further comprising an electrically controlled gearshift mechanism and/or an electrically controlled front derailleur.

* * * * *